April 7, 1953 G. C. SZIKLAI 2,634,327
TELEVISION SYSTEM
Filed May 20, 1947 2 SHEETS—SHEET 1

INVENTOR.
GEORGE C. SZIKLAI
BY
H. S. Grover,
ATTORNEY

April 7, 1953 G. C. SZIKLAI 2,634,327

TELEVISION SYSTEM

Filed May 20, 1947 2 SHEETS—SHEET 2

INVENTOR.
GEORGE C. SZIKLAI

BY H. S. Grover

ATTORNEY

Patented Apr. 7, 1953

2,634,327

UNITED STATES PATENT OFFICE 2,634,327

TELEVISION SYSTEM

George C. Sziklai, Princeton, N. J., assignor to Radio Corporation of America, a corporation of Delaware Application May 20, 1947, Serial No. 749,190

7 Claims. (Cl. 178—5.4)

This invention relates to television image reproducing systems and more particularly to those systems transferring a plurality of component images such as, for example, a simultaneous color television system.

It is generally well known in the television art that the transmission of visual information by electricity can be accomplished by analyzing an image into its image elements and deriving therefrom a signal train of impulses by an orderly sequence of scanning. The image may then be reproduced at a remote location by reconstruction of the image in the same orderly sequence of scanning. Since the scanning and the image repetition processes are essentially artificial ones, the method and means employed for reproduction, the total number of scanning lines and the total number of image elements in each line, the sequence of transmission of the lines, the aspect ratio of the image and the rate of image repetition may be chosen arbitrarily.

A system of interlaced scanning has been generally accepted for use in television systems throughout the world.

The basic system briefly explained above has been employed for multiple image transmission. We may define the two fundamental systems of multiple image transmission as sequential and simultaneous.

The sequential system transmits one image or component image at a time in sequence and at a rapid recurring rate.

The simultaneous system transmits, through a plurality of separate signal channels, all the images or component images simultaneously.

The simultaneous transmission of component images lends itself very well to different uses, probably the most important of which is the transmission of images in such a way as to make them reproducible at receiving points in substantially natural color.

It has been known for many years that the transmission of television images in color may be accomplished by additive methods, by transmitting signals representative of the image in each of a selected number of primary or component colors, which are three in number for a tricolor system or which may include, where desired, a monochrome signal addition known as the "key" image to sharpen outlines or, for a low degree of fidelity of color representation, even a bicolor system might be adopted. For any of these methods, however, the several produced component-color signal series may be transmitted simultaneously when a simultaneous multi-color method is adopted, or may be transmitted in sequence where a sequential additive method is adopted.

For purposes of explanation, the simultaneous method of image transmission referred to will be assumed to pertain only to the additive process. In such a method, the component colors into which the image is analyzed are usually chosen as red, blue and green.

In presently used sequential color television processes, a single iconoscope or other form of storage type camera tube (such as the so-called image iconoscope, the orthicon or the image orthicon) is exposed in succession to images giving color separation corresponding to the various selected component colors. During the period the camera tube is exposed to each color component image, the mosaic is concurrently scanned in well-understood manner to enable the transmission of signals representing the corresponding color separation image. Thus, each color separation or color component image contains, so to speak, a record only of motion falling within the corresponding color separation and mosaic scanning period. Any motion occurring between one scanning of the camera tube mosaic corresponding to a given color and the next scanning corresponding to the same color will not be registered in that color and cannot therefore appear as a blur or image extension in the next scanning for that color. Thus, in conventional systems, color action fringes are inevitably produced, and this is particularly objectionable when objects at no great distance from the television camera lens move fairly rapidly perpendicular to the optical axis of the camera lens.

In the conventional sequential multicolor television receiver, a kinescope or image producing tube is used. A black and white or monochrome image is produced thereon which corresponds to each given color component, this image being viewed or projected through a color filter of a component color corresponding to the desired component color instantaneously to be represented, and such an image representation persists substantially only during the period of the scanning of the fluorescent screen of the kinescope for that color component image. The process is then repeated for the next color component, and so on, with different component color filters successively coming between the tube screen and the observer, thus a brief flashing of each color component image recurs sequentially with spaces in between which are filled by the brief presentation or flashing of other color component images.

Such a procedure inherently leads to color action fringes for obvious reasons, and particularly with low repetition rates of color fields, results in considerable color flicker, especially for bright objects of defined color, and unless the field frequency is raised to very high values leading to a requirement for a very broad frequency band for the transmission, the resulting images must be of low light intensity to be enjoyed. An experimental sequential color television system is shown and described in an article entitled "An experimental color television system," by R. D. Kell, G. L. Fredendall, A. C. Schroeder, and R. C. Webb, beginning on page 141 of the "RCA Review" for June 1946.

It immediately becomes apparent that the transmission and reproduction of component color images simultaneously would eliminate the disadvantages referred to above, and furthermore, the simultaneous system of image transmission lends itself particularly well to the all-electronic method and means of pickup, transmission and reproduction. The elimination of motors, rotating color disks, or drums and the like, made possible by the employment of all-electronic means of image transmission, provides numerous advantages which immediately become apparent.

There is, however, one important difficulty in the simultaneous reproduction of component images. It will be remembered that in an additive process of color reproduction, it is essential that the several component images must be in substantially perfect registry to produce desirable results.

When three separate physical devices are employed, one for each of the component colors, there may be involved difficulties in mechanical alignment which preclude the convenient adjustment for proper registration of the several component images.

According to this invention, a system of image reproduction is employed which alleviates the necessity for repeated adjustment of individual image registry. An image tube is provided wherein the several component color images are reproduced in registry on a single screen of the tube.

There have been proposed heretofore several ingenious devices for accomplishing the reproduction of several component images on a single screen of an image reproducing tube. Such a device, for example, was proposed wherein a screen of an image producing tube is divided into a plurality of elemental areas undiscernible to the unaided eye but selectively characterized to generate a predetermined component color.

It is well known in the electronic art that a deflection of an electron beam may be accomplished with greater ease and accuracy when such an electron beam is travelling at a relatively low velocity. In the color system heretofore proposed wherein the electron beam is directed selectively to the proper elemental areas of the viewing screen in accordance with the incoming component color image signal train, the direction of the beam is accompanied by inaccuracies and other difficulties by reason of the fact that, in order to produce a sufficiently brilliant image, the electrons of the beam must be travelling at a rapid rate.

According to this invention, it is not necessary to deflect the electrons after they have been accelerated to a high rate to produce a brilliant image. The required deflection changes for purposes of forming a scanning raster is accomplished before the image is formed, and upon formation of an electron image representative of the image being transferred, the electrons are accelerated similar to that known in the art as the electron optics of an image tube.

In my Patent No. 2,573,777, dated November 6, 1951, there has been disclosed a method and means whereby such action has been accomplished by producing a scanning raster from which a secondary emissive cathode derives an electron image representative of the raster, and the modulation of the scanning raster is then accomplished by modulating the electron stream between the secondary emissive cathode and the luminescent screen of the image tube.

According to this invention, the scanning raster produces a raster of light energy which is converted into an electron image of the raster by the associated photo cathode. The electron flow from the photo cathode is then modulated before it reaches the associated luminescent screen.

The transmission of stereoscopic images can be accomplished if the identity of the right and left eye views can be maintained throughout transmission and reproduction. The identity can be maintained during transmission by sending right and left eye views alternately and at a rapid enough rate so that no flicker is evident. Systems of this type have been proposed employing vertical opaque strips whose width and spacing and distance from the image are chosen such that the image, which is made up of alternate vertical strips representative of alternately right and left eye views, will be resolved into a stereoscopic image.

This invention in one of its preferred forms lends itself particularly well for application to the reproduction of stereoscopic images.

According to one preferred form of this invention, a scanning raster is projected on a photo cathode of an image tube. An electron flow control means, to which a video signal is applied, is positioned between the photo cathode and luminescent screen of the image tube to modulate the flow of electrons between the photo cathode and the luminescent screen in accordance with the image signal train.

According to another preferred form of this invention, an all-electronic image reproducing system is provided wherein a scanning raster is formed on the photo cathodes of a plurality of image tubes. Each of the image tubes contains an electron flow control means positioned between the photo cathode and its associated luminescent screen to control the magnitude of the electron flow therebetween. A signal train representative of each of the different component images is applied to each of the electron flow control means, thus producing a component image on each of the luminescent screens. An optical system then combines the component images from all the luminescent screens to form a composite image, and it may, for example, be a color image if each of the component images represent a component color image for either direct viewing by an observer or projection.

According to another preferred form of this invention, a single image tube is employed whose photo cathode embodies a fine grid structure containing electrically separate but intermingled elements for each of the component image signals. A grid-like luminescent screen is constructed with separate elements in registry with the electron images of the elements of the photo cathode, the separate elements having separate identification characteristics to correspond with the corresponding control electrode elements in the photo cathode. The combination of the control electrodes embodied in the photo cathode and an associated auxiliary control electrode permits the flow of electrons in the image tube from the photo cathode to the composite luminescent screen in such a manner as to reproduce simultaneously all the component images.

According to still another preferred form of this invention, the elements for generating the scanning raster and the image tube elements are incorporated in the same envelope.

A primary object of this invention is to provide an improved television system particularly useful for color operations.

Another object of this invention is to provide an all-electronic simultaneous type image reproducing system.

Still another object of this invention is to provide for simultaneous color image reproduction which is substantially free from registration difficulties.

Other and incidental objects of the invention will be apparent to those skilled in the art from a reading of the following specification and an inspection of the accompanying drawing in which Figure 1 shows schematically one preferred form of this invention relating to monochrome image reproduction;

Figures 1, 2:
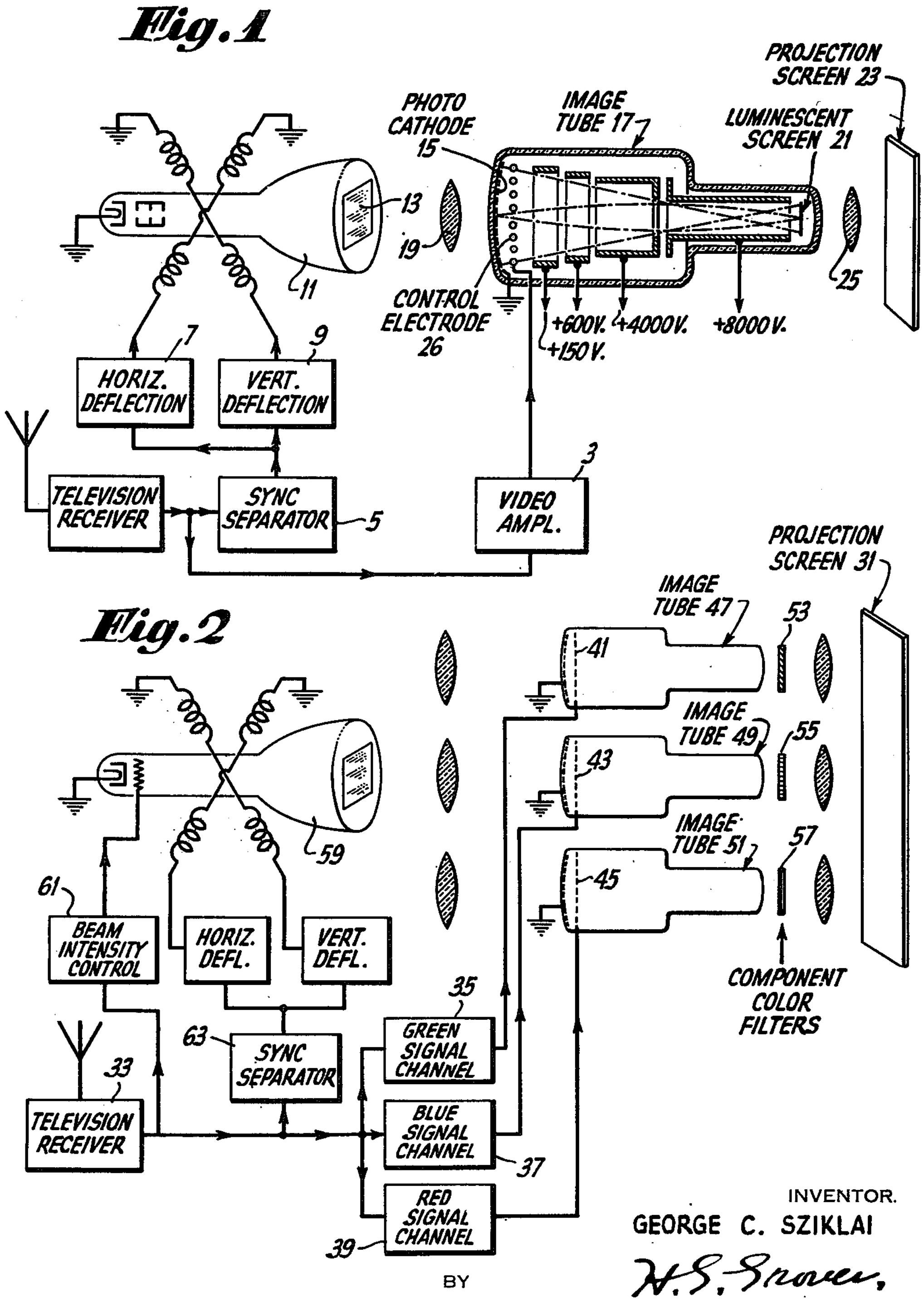
Figure 2 illustrates schematically one preferred form of this invention relating to color image reproduction.

Turning now in detail to Figure 1, there is shown a television receiver 1, its associated video amplifier 3, a sync separator 5, horizontal deflection generator 7, and vertical deflection generator 9. The receiver and the associated elements may take any of the well known forms such as, for example, that shown in the Carlson Reissue Patent No. 20,700, dated April 19, 1938, or represented, for instance, insofar as the signal selection is concerned, by Patent No. 2,551,228, dated May 1, 1951, of J. C. Achenbach. A sync separator which may be employed to separate the synchronizing signals from the video signals may, for example, be of the type shown and described in the U. S. patent to A. V. Bedford, No. 2,207,775, dated July 16, 1940, or the U. S. patent to R. L. Campbell, No. 2,178,736, dated November 7, 1939. The horizontal and deflection signal generators 7 and 9 have been well described in the U. S. patent to W. A. Tolson, No. 2,101,520, dated December 7, 1937. The patents listed are given by way of example only, however, any suitable devices for performing the same functions are satisfactory for employment in the practice of this invention.

Tube 11 is preferably of the type capable of producing a brilliant scanning raster 13 on its screen. Image producing tubes such as the kinescope, which is well described in an article by Dr. V. K. Zworykin entitled "Description of an experimental television system and kinescope" in the "Proceedings of the Institute of Radio Engineers," volume 21, No. 12, for December 1933, are capable of forming a scanning raster when employed in conjunction with horizontal and vertical deflection signal generators, as illustrated in blocks 7 and 9.

The scanning raster 13 is projected to the photo cathode 15 of the image tube 17 through a lens system 19. Image tube 17 is capable of reconstructing on its luminescent screen 21 an image focused on its photo cathode 15.

The operation of an image tube has been outlined in detail, beginning on page 385 of the "RCA Review" for September 1946. The image tube consists of a photo cathode, a fluorescent screen and an electron lens system contained in an evacuated glass envelope. When an image is focused on its photo cathode, electrons are emitted from it with a density distribution which corresponds to the distribution of illumination on the photo cathode. These electrons are accelerated and focused by an electron lens into an image which impinges upon the associated fluorescent screen. Here the energy contained in the speed of the electrons is converted into visible light, thus reproducing the image focused on the photo cathode.

The electron lens system employed in the image tube is comparable in many respects to an optical lens system. It consists of a series of coaxial cylinders with various potentials applied as indicated, for example, in the image tube shown in Figure 1.

It will be seen that, by controlling the flow of electrons between the photo cathode 15 and its associated luminescent screen 21, an image may be produced on the luminescent screen 21 from a blank scanning raster projected on photo cathode 15, if the system is maintained in synchronism with the image pick-up system. If the control of the flow of electrons is in some manner related to an image signal train such as a video signal produced during the scanning operation at a television transmitting station, an intelligence image is produced and the image produced on luminescent screen 21 may be viewed directly or projected as illustrated to screen 23 through a lens system 25.

The control of the flow of electrons between the photo cathode 15 and its associated luminescent screen 21 may be accomplished with a control electrode 26. If the potential of control electrode 26 by reason of an incoming signal is positive with respect to the potential of the photo cathode 15, electrons from the photo cathode 15 will be accelerated in the direction of the luminescent screen 21. However, if the potential of the control electrode 26 is negative with respect to the potential of the photo cathode 15 by reason of a signal from video amplifier 3, the electrons emitted from photo cathode 15 will be repelled. It will be seen, therefore, that the flow of electrons between photo cathode 15 and luminescent screen 21 may be modulated in accordance with the video signal passing through the video amplifier 3.

Turning now to Figure 2, there is shown a preferred form of this invention wherein a composite image, such as, for example, a colored image, may be reproduced on screen 31.

There is employed a suitable television receiver 33 for the reception of color image signals, preferably of the simultaneous type of transmission referred to above. By separating the component image signals, as illustrated, for example, in the green signal channel 35, the blue signal channel 37 and the red signal channel 39, separate component color image signals may be applied to each of the three control electrodes 41, 43 and 45 of image tubes 47, 49 and 51, respectively. By employing a green component color filter 53, a blue component color filter 55 and a red component color filter 57, adjacent their respective screens, and by so aligning the image tubes and their associated lens systems with projection screen 31 such that all three component images will properly register, it will be seen that the composite image formed will be a color image.

It often becomes desirable to control the intensity of the electron beam in the raster producing tube 59. This is accomplished through beam intensity control channel 61. The intensity of the beam may be controlled for purposes of blanking, or for purposes of supplementing the color image with a black and white image, either of the same type or different from that transmitted through the channel controlling the electron flow through the image tube.

Very often the green signal channel 35 is employed for the transmission of synchronizing and blanking signals. Although the sync separator 63 is shown connected directly to the television receiver 33, it may obtain its signals from the green signal channel circuit 35.

Figures 3, 4, 5:
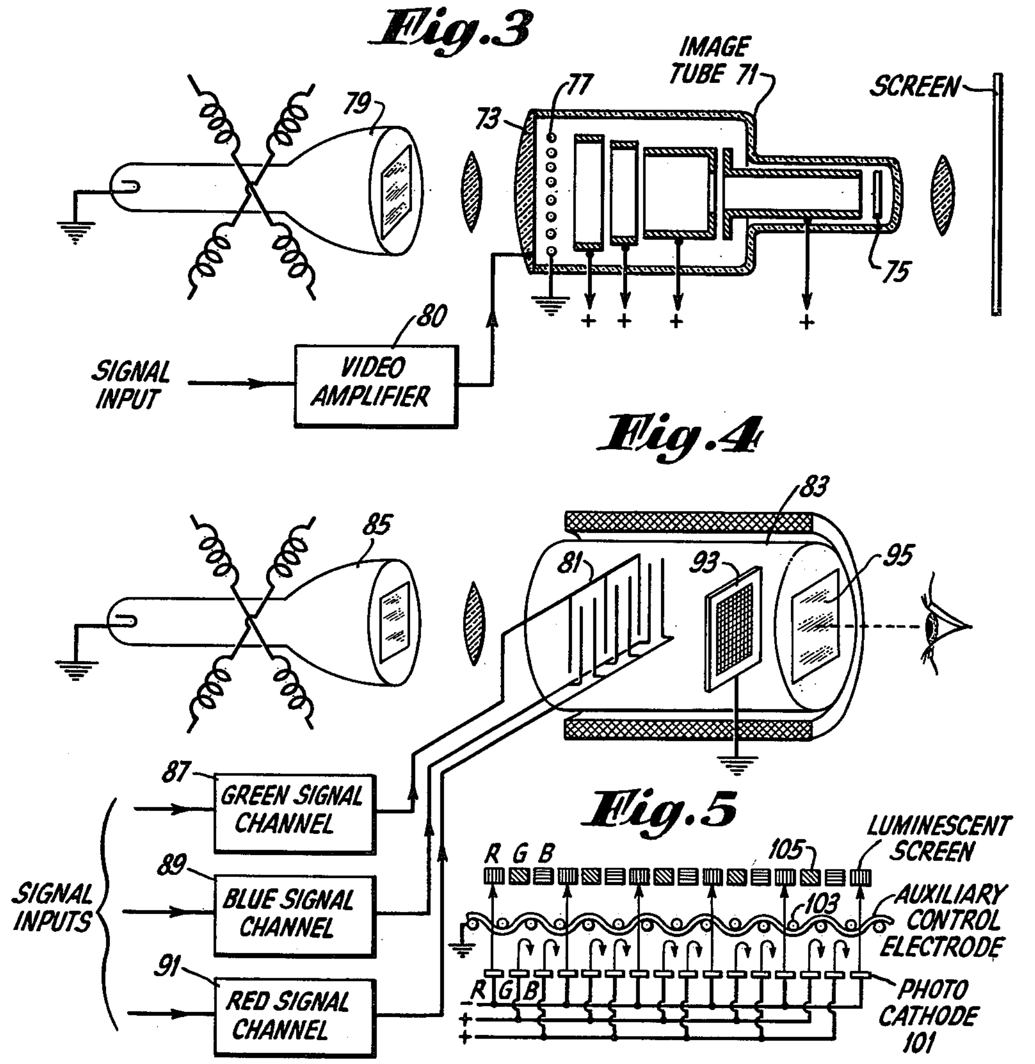
Figure 3 shows still another preferred form of this invention, as applied to monochrome image reproduction.
Figure 4 illustrates still another preferred form of this invention showing simultaneous color image reproduction.
Figures 5 and 6 illustrate in detail element structure employed in a preferred form of this invention.

Turning now to Figure 3, there is shown still another preferred form of this invention involving tube 71 having a photo cathode 73, a luminescent screen 75 and an auxiliary control electrode 77.

A scanning raster, either blank or modulated, is projected on photo cathode 73 by the scanning raster producing tube 79. A video signal whose associated synchronizing signals are employed for the production of the scanning raster on tube 79, is transmitted through video amplifier 80 to the photo cathode 73. Auxiliary control electrode 77 should be maintained at a substantially constant potential, and for the purposes of illustration, it is therefore connected to ground, as illustrated in Figure 3. By changing the potential of the photo cathode 73, it will be seen that a modulation of the electron flow between photo cathode 73 and luminescent screen 75 may be had. The reason for the modulation may be explained briefly as follows. An electron leaving the photo cathode 73 at an instant the photo cathode 73 is charged positive with respect to auxiliary control electrode 77 will be repulsed by auxiliary control electrode 77 and returned to the photo cathode 73, however, an electron leaving photo cathode 73 at a time when photo cathode 73 is charged negatively with respect to auxiliary control electrode 77 is accelerated in its path by auxiliary control electrode such that it passes through the grid structure of auxiliary control electrode 77 and impinges on the luminescent screen 75 to form a part of the reconstructed image. It will be seen, therefore, that the transmitted television image may be reconstructed on luminescent screen 75 by varying the potential of the photo cathode 73 in accordance with the video signals obtained from video signal amplifier 80.

In Figure 4, there is shown a preferred form of this invention involving the image tube electron flow modulation principle explained under Figure 3 above, however, the photo cathode 81 of image tube 83 is so constructed that it contains a plurality of miniature parallel elements, every third one, for example, being connected together.

The size and spacing of the individual elements in the structure of photo cathode 81 must be indistinguishable to the unaided eye in order to perform their function properly. Photoelectric screens of this nature have been constructed, and probably the simplest way to provide such a structure as shown is to evaporate the photoelectric material through a mask on a transparent insulating sheet, such as mica, glass, or the like. If the photoelectric material is deposited in sufficient thickness, it will be conductive while it is still transparent. It is advisable that the photosensitive material and the phosphor should be separated somehow, because even a slight amount of alkali impurity poisons the phosphor material, and the photosensitive materials presently used are usually alloys of such materials.

Green signal channel 87 is connected to one set of the elements of the photo cathode 81, and blue signal channel 89 is connected to another set of the elements of the photo cathode 81, and red signal channel 91 is connected to still a third set of elements of photo cathode 81. An auxiliary control electrode 93 is provided having a constant potential.

It follows from the explanation of the operation of this type of image tube given in Figure 3 above that when, for example, a negative signal is supplied to the elements of the photo cathode connected to the green signal channel and a positive potential is applied to the other elements connected to the blue signal channel 89 and the red signal channel 91, electrons will only be emitted from that portion of the photo cathode 81 which is at a negative potential with respect to the auxiliary control electrode 93 or the elements connected to the green signal channel 87.

If, however, the incoming signal changes such that the blue signal channel 89 produces a negative signal with respect to the auxiliary control electrode 93, and at the same time the green signal channel 87 and the red signal channel 91 produce a signal positive with respect to the potential of the auxiliary control electrode 93, a series of minute vertical lines will be produced on screen 95 corresponding to the position of the elements of photo cathode 81, which are connected to the blue signal channel 89.

It follows that, if the screen 95 is composed of color producing phosphors or component color filters whose width corresponds to the width of the electron image of the elements of photo cathode 81 and whose colors correspond to the associated signal channels, a color image may be reproduced on luminescent screen 95.

The operation of the photo cathode 81 and the auxiliary control electrode 93 may be further explained by reference to Figures 5 and 6.

The blocks 101 represent in a greatly enlarged cross-section the elements of photo cathode 81 of Figure 4. It will be seen that every third block is interconnected to each other to form, for example, a red system, a green system and a blue system, as indicated.

An auxiliary control electrode 103 is positioned adjacent to the elements 101 and connected to ground, as illustrated.

If, for example, a negative signal with respect to ground is connected to the red elements, the electrons emitted from the red elements will pass through the screened structure of the auxiliary control electrode 103 to luminescent screen 105, as illustrated. If a positive potential is applied to the green and the blue elements, as illustrated, the electrons emitted from the green and blue elements will be repulsed and prevented from passing through the auxiliary control electrode 103 to the luminescent screen 105.

Figure 6:
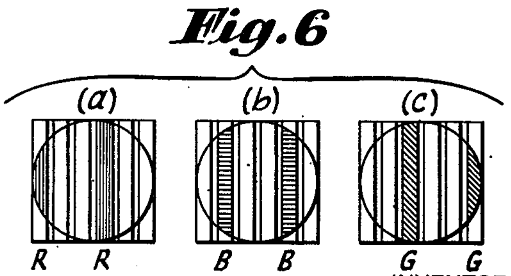

Turning now to Figure 6, there is illustrated the elemental areas enlarged to show, for example, the relative size of the diameter of an electron beam or elemental area with respect to the elemental area of, for example, the photo cathode 81 of Figure 4 or the elemental color filter areas or color responisve areas of luminescent screen 95 of Figure 4. "*a*" of Figure 6 illustrates, for example, an enlarged element of luminescent screen 95 during an interval in which only a red signal is negative with respect to the auxiliary control electrode 93, and thus eliminating the red strips in front of the electron beam intersection as illustrated. "*b*" illustrates an instant during which the blue signal channel is effective. Likewise, "*c*" represents a time interval when only the green signal channel is active. In this particular example, the width of the vertical strips in the luminescent screen 95 are approximately ⅙ the diameter of the associated electron beam. It will be seen, therefore, that the unaided human eye would be unable to detect the difference in color of the adjacent strips.

Figure 7:
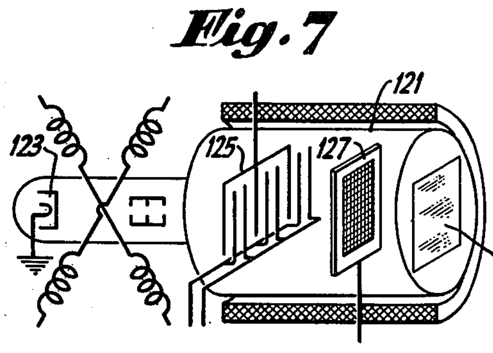
Figure 7 shows still another preferred form of this invention for the reproduction of images in color.

Turning now to Figure 7, there is shown still another preferred form of this invention wherein the component for producing the scanning raster is included in the same evacuated envelope with the image tube components. An element 121 contains an electron gun 123 with its associated beam forming structure. The photo cathode 125 and the auxiliary control electrode 127 are included in the same envelope. In the opposite end of the envelope, for example, from the electron gun 123 is positioned a luminescent screen 129. In this preferred form of the invention, the photo cathode 125 is constructed similarly to the photo cathode illustrated in the image tube 83 of Figure 4.

The electron beam generated in electron gun 123 impinges on photo cathode 125 and produces a spot of light which causes an emission of electrons from the opposite side of the photo cathode.

Having thus described the invention, what is claimed is:

1. A color image reproducing device comprising in combination a photo cathode having associated therewith separate component color selective and intermingled groups of sequentially interpositioned electrically connected and electrically conductive strip shaped elemental areas extending across substantially all the area of said photo cathode, an electron lens system, a substantially white luminescent screen and a ruled color filter associated therewith and consisting of strips of different color components in substantial registry with the electron image of the corresponding color representative elements associated with said photo cathode, means for developing a scanning raster on said photo cathode, means to control the magnitude of the flow of electrons from each group of elemental areas of said luminescent screen, and means connected to said electron flow magnitude control means to vary the potential applied thereto to construct an intelligence image on said luminescent screen.

2. In a television system, an image reproducing device comprising in combination a photo cathode, an electron lens system, a luminescent screen, means for developing a scanning raster on said photo cathode, a control electrode positioned between said photo cathode and said luminescent screen to control the magnitude of the flow of electrons from said photo cathode to said luminescent screen upon a change in control electrode potential relative to the potential of said photo cathode, and means connected between said photo cathode and said control electrode to vary the potential applied between said photo cathode and said control electrode to construct an intelligence image on said luminescent screen.

3. An image reproducing device comprising in combination a photo cathode, an electron lens system, a luminescent screen, means for developing a scanning raster on said photo cathode, said scanning raster containing an auxiliary image, means to control the magnitude of the flow of electrons from said photo cathode to said luminescent screen, and means connected to said electron flow magnitude control means to vary the potential applied thereto to construct an intelligence image on said luminescent screen.

4. In a television system, a color image reproducing device comprising in combination a plurality of image tubes, each containing a photo cathode, an electron lens system and a luminescent screen, means for developing a scanning raster on each of said photo cathodes, a control electrode positioned between each of said photo cathodes and its associated luminescent screen to control the magnitude of the flow of electrons from the photo cathode to its associated luminescent screen upon a change in control electrode potential, separate means connected to each of said control electrodes and each passing a component signal representative of a component color of an image to be reproduced, component color filters positioned adjacent each of said luminescent screens and each representative of the component color whose signal is applied to the control electrode associated with the adjacent luminescent screen, and means for superimposing said component color images to form a composite color image.

5. In a color television system, an image reproducing device comprising in combination a photo cathode, an electron lens system, a luminescent screen, means for developing a scanning raster on said photo cathode, an auxiliary control electrode positioned between said photo cathode and said luminescent screen, means for maintaining said auxiliary control electrode at a substantially constant potential, said photo cathode having as a part thereof a plurality of separate control electrodes, each having elements positioned sequentially and extending across substantially all the area of said photo cathode to control the magnitude of the flow of electrons from said photo cathode to said luminescent screen upon a change in control electrode potential, and separate means connected to each group of said commonly connected control electrodes and each passing a component signal representative of a component color of an image to vary the potential applied to said control electrodes to construct an intelligence image on said luminescent screen.

6. An image reproducing device comprising a photo cathode, an electron lens system, a fluorescent screen, means for liberating electrons from said photo cathode, said electron liberating means being arranged to develop a scanning raster on said photo cathode, control means for controlling the magnitude of the flow of electrons from the photo cathode to the fluorescent screen, said control means being positioned in the path of said electron flow, and means connected with the control means for varying the potential applied thereto to construct an intelligence image on the fluorescent screen.

7. A device according to claim 6, wherein the control means comprises a control electrode positioned between the photo cathode and the fluorescent screen, to control the magnitude of the flow of electrons from the photo cathode to the luminescent screen upon a change in control electrode potential.

GEORGE C. SZIKLAI.

REFERENCES CITED

The following references are of record in the file of this patent:

UNITED STATES PATENTS

| Number | Name | Date |
|---|---|---|
| 2,118,160 | Cawley | May 24, 1938 |
| 2,150,168 | Ives | Mar. 14, 1939 |
| 2,213,178 | Iams | Aug. 27, 1940 |
| 2,219,113 | Ploke | Oct. 22, 1940 |
| 2,239,769 | Batchelor | Apr. 29, 1941 |
| 2,280,191 | Hergenrother | Apr. 21, 1942 |
| 2,296,908 | Crosby | Sept. 29, 1942 |
| 2,307,188 | Bedford | Jan. 5, 1943 |
| 2,310,863 | Leverenz | Feb. 9, 1943 |
| 2,343,825 | Wilson | Mar. 7, 1944 |
| 2,417,446 | Reynolds | Mar. 18, 1947 |
| 2,461,515 | Bronwell | Feb. 15, 1949 |

FOREIGN PATENTS

| Number | Country | Date |
|---|---|---|
| 475,047 | Great Britain | Nov. 11, 1937 |
| 498,824 | Great Britain | Jan. 3, 1939 |
| 513,099 | Great Britain | Oct. 3, 1939 |